US010543768B2

(12) United States Patent
Richards et al.

(10) Patent No.: US 10,543,768 B2
(45) Date of Patent: Jan. 28, 2020

(54) ADJUSTABLE ARMREST SYSTEMS AND METHODS FOR A MATERIAL HANDLING VEHICLE

(71) Applicant: The Raymond Corporation, Greene, NY (US)

(72) Inventors: Curtis Donald Richards, Greene, NY (US); Daniel Philip Adelmann, Otego, NY (US)

(73) Assignee: The Raymond Corporation, Greene, NY (US)

( * ) Notice: Subject to any disclaimer, the term of this patent is extended or adjusted under 35 U.S.C. 154(b) by 292 days.

(21) Appl. No.: 15/782,273

(22) Filed: Oct. 12, 2017

(65) Prior Publication Data
US 2018/0105081 A1   Apr. 19, 2018

Related U.S. Application Data

(60) Provisional application No. 62/407,834, filed on Oct. 13, 2016.

(51) Int. Cl.
*B60N 2/75* (2018.01)
*B66F 9/075* (2006.01)

(52) U.S. Cl.
CPC ............... *B60N 2/77* (2018.02); *B60N 2/797* (2018.02); *B66F 9/0759* (2013.01)

(58) Field of Classification Search
CPC .. B60N 2/77; B60N 2/75; B60N 2/797; B66F 9/0759
USPC ............................................. 296/240.34, 153
See application file for complete search history.

(56) References Cited

U.S. PATENT DOCUMENTS

| 1,952,744 | A | | 3/1934 | Chapman |
| 3,206,249 | A | * | 9/1965 | Gateley .................. A47C 7/546 |
| | | | | 297/411.23 |
| 4,619,478 | A | * | 10/1986 | Heimnick ................ B60N 2/78 |
| | | | | 296/153 |
| 5,749,628 | A | | 5/1998 | Synder et al. |
| 5,895,095 | A | | 4/1999 | Chen |
| 6,176,550 | B1 | | 1/2001 | Lamart et al. |
| 6,182,778 | B1 | | 2/2001 | Henshaw et al. |
| 7,014,255 | B2 | | 3/2006 | Amamiya et al. |
| 7,066,546 | B2 | | 6/2006 | Trego et al. |
| 7,350,866 | B2 | | 4/2008 | Billger et al. |
| 7,438,318 | B2 | | 10/2008 | Sano |
| 7,726,745 | B2 | | 6/2010 | Bruns et al. |
| 7,841,665 | B2 | | 11/2010 | Geister et al. |
| 8,016,360 | B2 | | 9/2011 | Machael et al. |

(Continued)

FOREIGN PATENT DOCUMENTS

JP    2004322730 A    11/2004

OTHER PUBLICATIONS

Extended European Search Report issued in corresponding European Application No. 17196237.6, dated Feb. 28 2018, 9 pages.

*Primary Examiner* — Joseph D. Pape
(74) *Attorney, Agent, or Firm* — Quarles & Brady LLP

(57) ABSTRACT

Provided are systems and methods for adjusting an armrest assembly, the assembly comprising an armrest that includes an armrest pad, a rising platform having a nut aperture, a nut positioned within the nut aperture. The assembly further includes a rod assembly coupled with the armrest, an adjustment mechanism for raising or lowering the armrest, and may include one or more rotation stops coupled with a stationary plate.

20 Claims, 4 Drawing Sheets

(56) References Cited

U.S. PATENT DOCUMENTS

| | | |
|---|---|---|
| 9,058,052 B2 | 6/2015 | Bruns et al. |
| 2010/0187889 A1 | 7/2010 | Bruns et al. |
| 2015/0210287 A1 | 7/2015 | Penilla et al. |
| 2017/0282760 A1* | 10/2017 | Ligi .................. B60N 2/78 |

* cited by examiner

ADJUSTABLE ARMREST SYSTEMS AND METHODS FOR A MATERIAL HANDLING VEHICLE

CROSS REFERENCE TO RELATED APPLICATIONS

This application claims the benefit of U.S. Provisional Patent Application Ser. No. 62/407,834, filed Oct. 13, 2016, and entitled "Adjustable Armrest Systems and Methods for a Material Handling Vehicle," which is hereby incorporated by reference in its entirety.

STATEMENT OF FEDERALLY SPONSORED RESEARCH OR DEVELOPMENT

Not applicable.

FIELD OF THE INVENTION

The present disclosure relates to an adjustable armrest, and more particularly to adjustable armrest systems and methods for a material handling vehicle, as disclosed herein.

BACKGROUND

Material handling vehicles are commonly found in warehouses, factories, shipping yards, and, generally, wherever pallets, large packages, or loads of goods are required to be transported from place to place. Material handling vehicles typically include load-bearing forks for lifting packages or pallets for transporting, a drive motor for propelling the truck, a steering control mechanism, an operator compartment, and a brake. A user or operator of the material handling vehicle may stand or sit within the operator compartment during use, which, in some cases, can be for an entire shift.

To provide enhanced comfort for the operator while operating a material handling vehicle, operator compartments may include an armrest. However, such armrests are typically not easily adjustable. For example, some previous armrests have been adjustable through the use of two telescoping pipes having apertures therethrough and a pin placed through the apertures to lock the telescoping pipes in place. These and other previously used armrest assemblies have not included a mechanism for easily adjusting the height of the armrest.

While it is known to provide a fixed armrest against which an operator may lean while operating a material handling vehicle, such armrests may not be desirably positioned to fully optimize comfort for a range of operators. Although armrest assemblies including a control handle are known that are adjustable up and down along a linear path, these assemblies are costly to manufacture due to the control handle moving with the armrest.

Therefore, it is desirable to provide an easily adjustable armrest for a material handling vehicle that can be positioned along any linear path and can be locked into place.

SUMMARY OF THE INVENTION

The present disclosure provides systems and methods for an assembly for adjusting an armrest that can be disposed within an operator compartment of a material handling vehicle.

In some forms, an assembly for adjusting an armrest comprises an armrest that includes an armrest pad, a rising platform having a nut aperture, and a nut positioned within the nut aperture. The assembly further includes a rod assembly that includes a rod and is coupled with the armrest, an adjustment mechanism for raising or lowering the armrest, and one or more rotation stops coupled with a stationary plate. In some embodiments, the rod assembly includes the rod, a flanged bushing, and a nut coupled with the rising platform. In some embodiments, the rod includes a threaded end and a handle end, wherein the threaded end is threaded through the nut, and the handle end is coupled with the adjustment mechanism. In some embodiments, the adjustment mechanism includes a crank, a crank rod, a spring, and a crank handle.

In still some embodiments, the crank is coupled with the handle end of the rod and the crank rod, and the spring and the crank handle are positioned along an elongate portion of the crank rod. In still further forms, the adjustment mechanism includes a smart device electrically coupled with a drive gear, and a slave gear in communication with the drive gear and coupled to the rod. In some embodiments, the assembly includes one or more handle slots within the rotation stops. In some embodiments, the assembly includes one or more mounting spacers positioned between the armrest pad and the rising platform. In still some forms, the armrest pad includes an arm slot and the rising platform has a rounded rectangle shape. In some forms, the stationary plate is coupled with a material handling vehicle.

In other embodiments, an assembly for adjusting an armrest includes an armrest including an armrest pad, a rising platform having a nut aperture, and a nut positioned within the nut aperture. The assembly further includes a rod assembly coupled with the armrest, the rod assembly including a threaded rod and a flanged bushing. The assembly also includes an adjustment mechanism for raising or lowering the armrest, the adjustment mechanism being mechanically coupled with the threaded rod, and one or more rotation stops coupled with a stationary plate, such that the flanged bushing is in rotatable communication with a bore within the stationary plate.

In some embodiments, the nut is a precision round nut. In some embodiments, the adjustment mechanism includes a handle coupled with the threaded rod. In still other embodiments, the adjustment mechanism includes a smart device electrically coupled with one or more gears, the one or more gears mechanically coupling the smart device with the threaded rod. In further forms, the armrest assembly includes two or more elongate mounting spacers positioned between the armrest pad and the rising platform. In some embodiments, the one or more rotation stops each include a first wall, a second wall, and a third wall.

In some forms, a method of vertically translating an armrest assembly includes engaging a rod assembly with an adjustment mechanism and an armrest, the armrest including an armrest pad, a rising platform having a nut aperture, and a nut positioned within the nut aperture. The method further includes adjusting the adjustment mechanism to initiate vertical translation of the armrest, wherein adjusting the adjustment mechanism includes rotating a rod of the rod assembly about an axis to vertically translate the armrest.

In some forms, adjusting the adjustment mechanism includes rotating a crank handle about the axis, wherein the crank handle is coupled with a crank rod and a crank, the crank being rotatably coupled with a handle end of the rod. In some forms, the method includes engaging the crank rod within a slot of a stationary plate, the stationary plate having a bore therethrough and a flanged bushing being positioned within the bore. In some forms, adjusting the adjustment mechanism includes initiating a smart device to rotate a drive gear that is coupled with a slave gear, the slave gear being fixedly attached with the rod.

DETAILED DESCRIPTION OF THE PREFERRED EMBODIMENT

Figure 1:
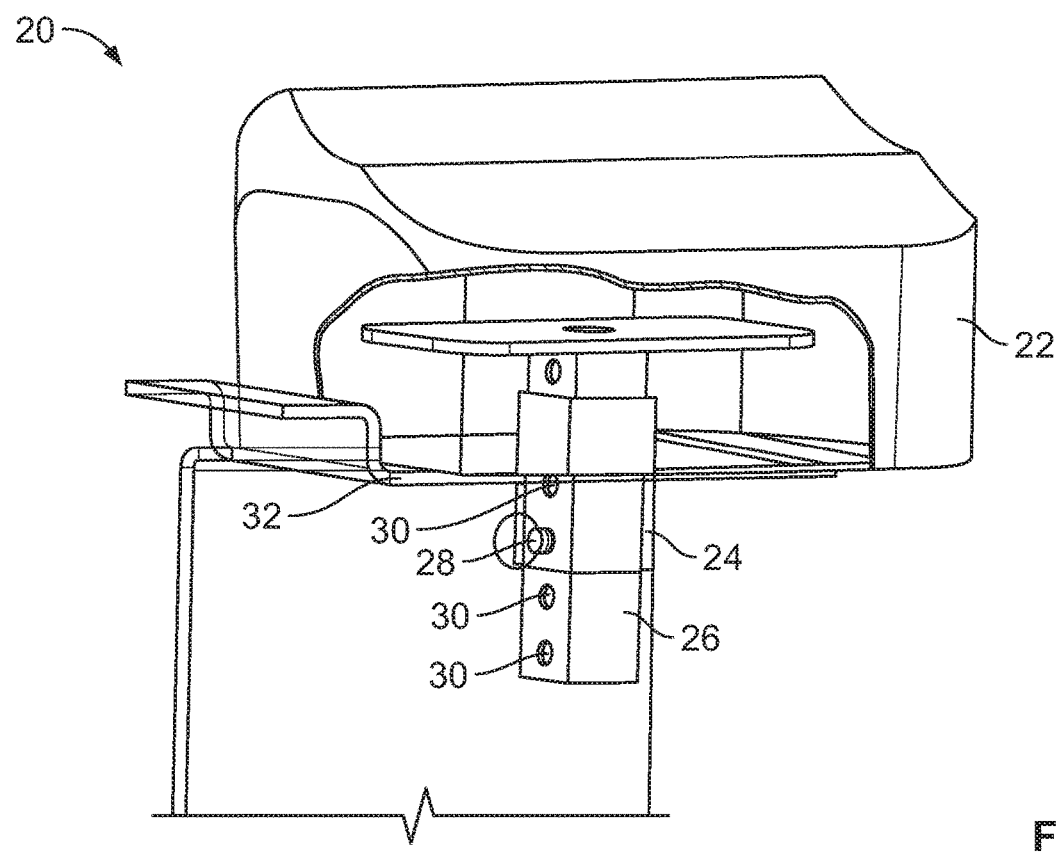
FIG. 1 is an isometric view of a prior art assembly for adjusting an arm rest.

Before any embodiments of the disclosure are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize that the examples provided herein have many useful alternatives and fall within the scope of embodiments of the invention. Further, while the embodiments disclosed herein are intended for use with a material handling vehicle, those of ordinary skill in the art would recognize that such embodiments could also be used with user or operator compartments of other vehicles.

Turning to the figures, the following description and drawing figures pertain to embodiments of the invention directed toward an adjustable armrest for use in a material handling vehicle. While embodiments of the invention will be described that include an armrest coupled with a threaded rod or screw which provides a means for raising and lowering the armrest, one of ordinary skill in the art would recognize that other mechanisms for raising or lowering the armrest may be used. Further, any of the components described herein may be separately attached to the armrest, or may be integrally formed with other components of the armrest.

Figure 2:
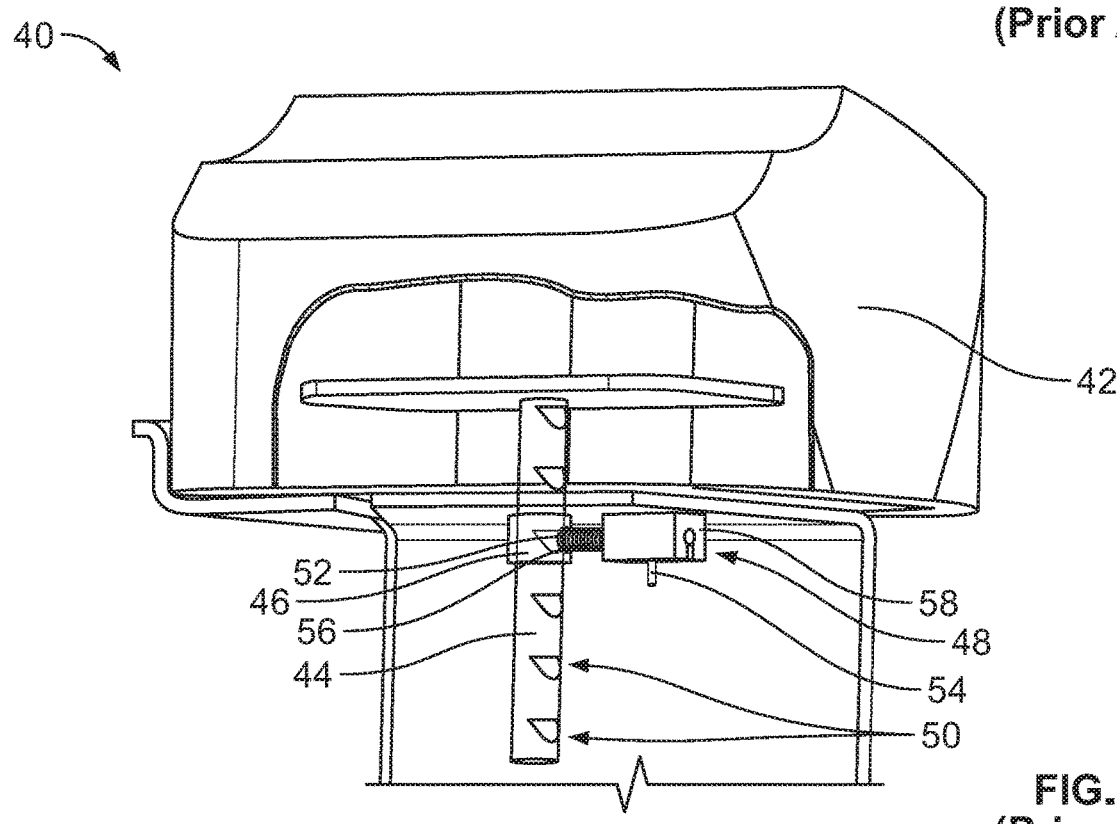
FIG. 2 is an isometric view of another embodiment of a prior art assembly for adjusting an arm rest.

As illustrated in the isometric views of FIGS. 1 and 2, previous devices for adjusting an armrest of a material handling vehicle are shown. Referring to FIG. 1, a known assembly 20 for adjusting an armrest 22 for a material handling vehicle is shown. The assembly 20 includes the armrest 22, a female telescoping pipe 24, a male telescoping pipe 26, and a spring pin 28. Both the female telescoping pipe 24 and the male telescoping pipe 26 have a plurality of apertures 30 provided therethrough. The spring pin 28 is inserted through one of the plurality of apertures 30 when the assembly 20 is in an operable condition. Before use, the female telescoping pipe 24 is coupled in some fashion to a side of the material handling vehicle, for example, to a plate 32. The male telescoping pipe 26 is coupled with the armrest 22, and is inserted into the female telescoping pipe 24. A user determines a height at which she desires to keep the armrest 22 in place, and places the spring pin 28 through the aperture among the plurality of apertures 30 within both the female and male telescoping pipes 24, 26 corresponding to the desired height.

Referring now to FIG. 2, another known assembly 40 for adjusting an armrest 42 for a material handling vehicle is shown. The assembly 40 includes the armrest 42, a rod 44, a pipe 46, and a spring loaded stop 48. The rod 44 includes a plurality of notches 50 that receive a projection 52. The projection 52 extends laterally from the spring loaded stop 48. The spring loaded stop 48 includes a handle 54, which is integrally formed with the projection 52, which allows a user to retract the projection 52. The stop 48 also includes a spring 56 positioned circumferentially around the projection 52, which biases the projection 52 toward the rod 44. A housing 58 encloses the projection 52 of the spring loaded stop 48. During use, a user pulls the handle 54 away from the rod 44, and adjusts the armrest 42 by vertically adjusting the rod 44 up or down until a desired height is achieved. When the desired height is achieved, the user releases the handle 54 of the spring loaded stop 48, which allows the spring 56 to bias the projection 52 into one of the plurality of notches 50 that corresponds to the desired height of the armrest 42.

Figure 3:
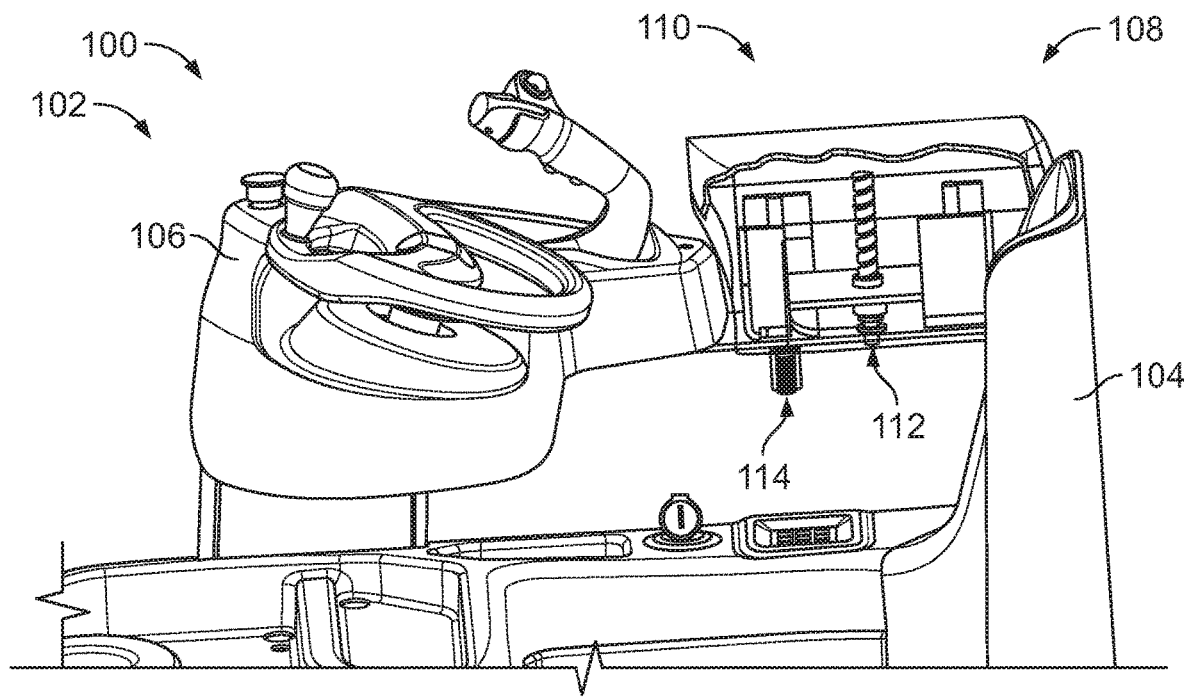
FIG. 3 is an isometric view of an operator compartment having an armrest assembly according to the present disclosure, the armrest being in a non-adjusted position.

Referring to FIG. 3, embodiments of the systems and methods disclosed herein will now be discussed. FIG. 3 illustrates an operator compartment 100 of a material handling vehicle 102. The operator compartment 100 can include a seat back 104 for an operator to either sit or stand against during operation of the material handling vehicle 102. Within the operator compartment 100 can be a steering console 106 and an assembly 108 for raising an armrest 110. The assembly 108 can include the armrest 110. The assembly 108 can also include a rod assembly 112 and an adjustment mechanism 114. The assembly 108 is shown in a non-adjusted state in FIG. 3 and is shown in an adjusted state in FIG. 4. In the adjusted state, the armrest 110 is disposed in a higher position vertically than in the non-adjusted state. As will be discussed in greater detail below, the assembly 108 is adjustable such that a number of vertical positions may be achieved by the user. As a result, the armrest 110 may be in a number of different positions when in the adjusted state.

Figure 4:
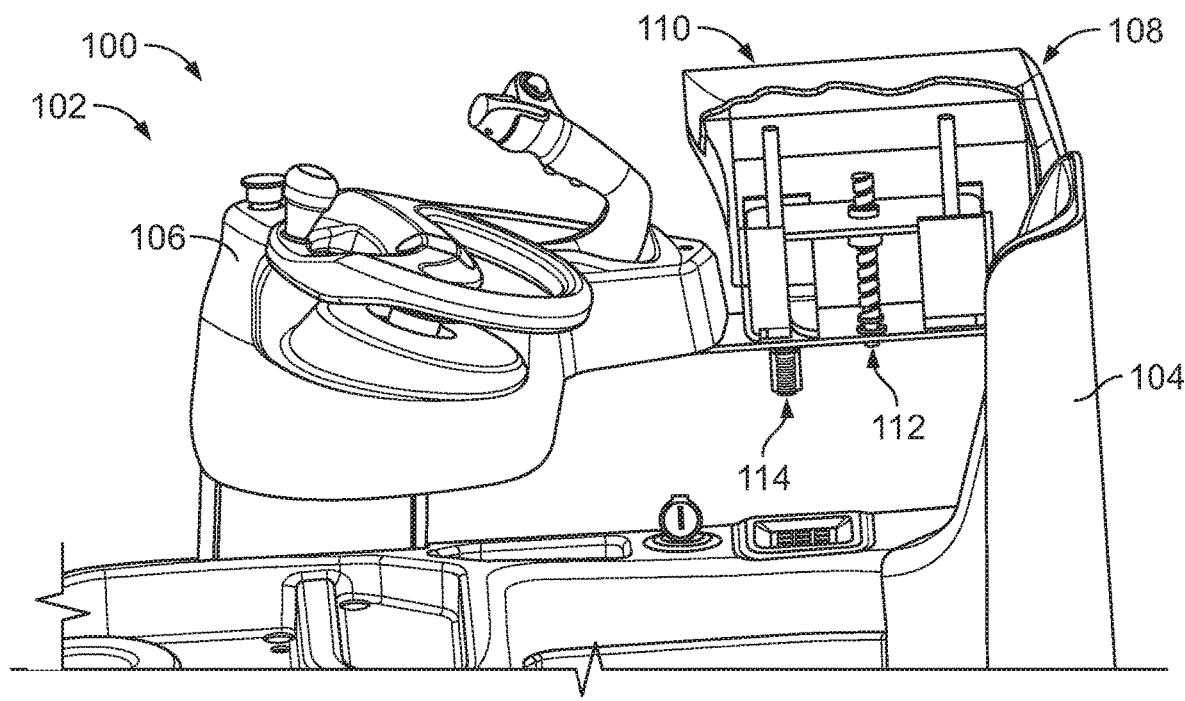
FIG. 4 is an isometric view of the operator compartment including the armrest assembly of FIG. 3, the armrest being in an adjusted position.
Figure 5:
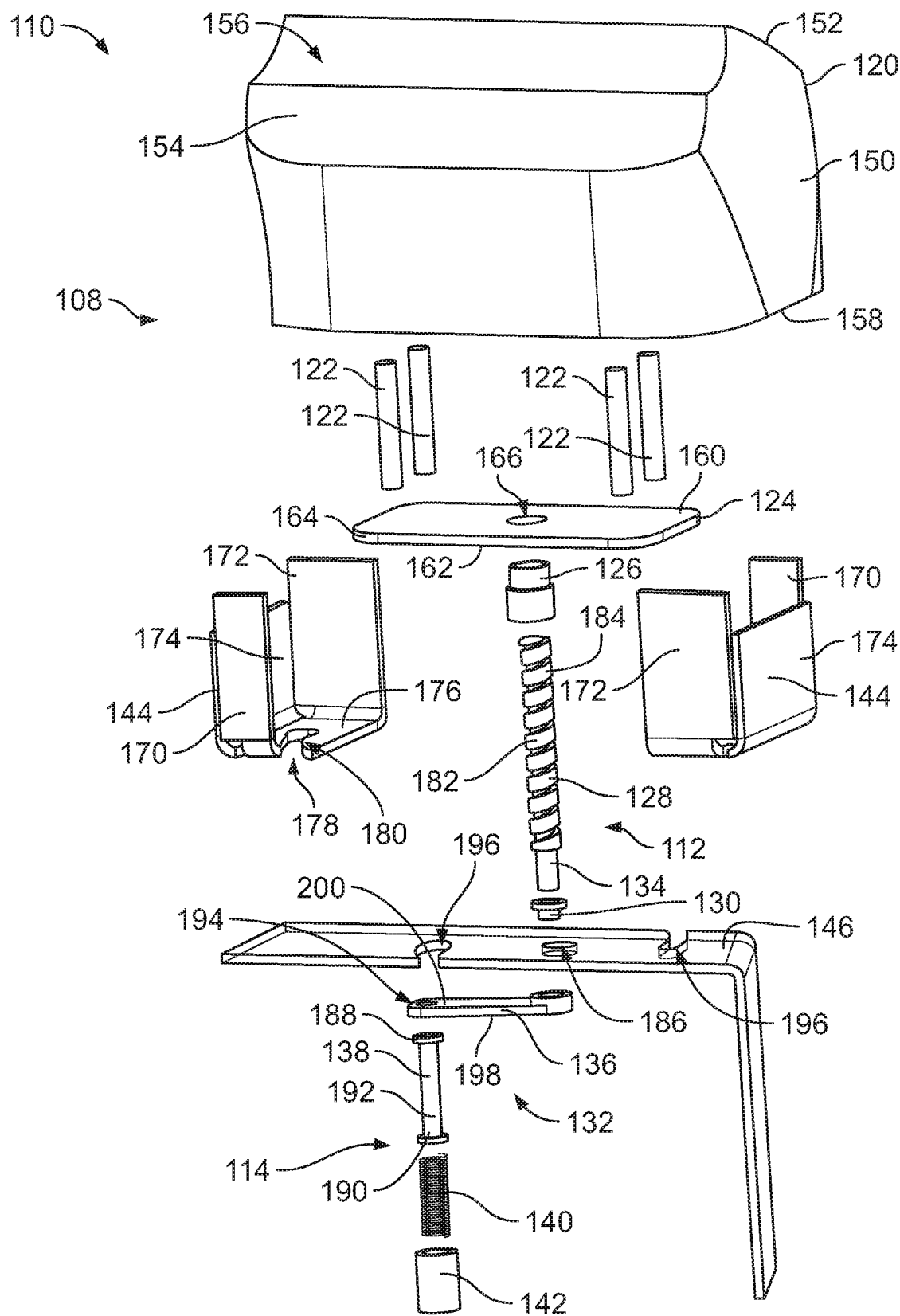
FIG. 5 is an exploded view of the components of the armrest assembly of FIG. 3.

An exploded view of the armrest 110 of FIGS. 3 and 4 is shown in FIG. 5. The armrest 110 can include an armrest pad 120, one or more mounting spacers 122, a rising platform 124, and a nut 126. The rod assembly 112, which in some embodiments is coupled with the armrest 110, can include a rod 128 and a bushing 130, which may be an oil-embedded flanged bushing. The bushing 130 may also be another type of bushing. In some embodiments, the bushing 130 is not included. The adjustment mechanism 114 can include a rotatable handle 132, which is coupled with a handle end 134 of the rod 128. The handle 132 can include a crank 136, a crank rod 138, a spring 140, and a crank handle 142. The assembly 108 can further include one or more rotation stops 144 and a stationary plate 146, which is in turn coupled with the operator compartment 100 of the material handling vehicle. As a result, the assembly 108 can include the armrest 110, the rod assembly 112, the adjustment mechanism 114, the one or more rotation stops 144, and the stationary plate 146.

Still referring to FIG. 5, the armrest pad 120 can include an outer side 150, a top angled side 152, a top curved side 154, and an arm slot 156. The outer side 150 circumscribes the outer surface of the armrest pad 120. A lower edge 158 of the armrest pad 120 can intersect with the outer side 150 and generally defines the shape of a curved rectangle. However, the lower edge 158 may have any shape known to those of ordinary skill in the art, and may have curved or bowed portions. The outer side 150 can intersect with the top angled side 152 and the top curved side 154.

The angled side 152 and the curved side 154 are interchangeable, and may alternatively be planar, or have another shape depending on the desired aesthetic and functional aspects for the assembly 108. In some embodiments, and as illustrated in FIG. 3, the curved side 154 is closer to the operator compartment 100 of the material handling vehicle, while the angled side 152 is disposed on an opposite side of the armrest pad 120. Both the curved side 154 and the angled side 152 can intersect with the arm slot 156 of the armrest pad 120. The arm slot 156 is generally formed in the shape of a half cylinder, and receives the arm of an operator of the material handling vehicle 102. The arm slot 156 may have any shape known to those of ordinary skill in the art that would allow the slot 156 to appropriately receive the arm of an operator. Further, the armrest pad 120 may not include an arm slot 156. In some embodiments, a different armrest pad 120 can be used.

The mounting spacers 122 are used to provide support between the rising platform 124 and the armrest pad 120. Any number of spacers 122 may be used within the armrest 110. In some embodiments, two of the spacers 122 are included. In other embodiments, three of the spacers 122 are used. In some embodiments, and as illustrated in FIG. 5, four of the spacers 122 are included. The mounting spacers 122 may be cylindrical hollow or solid pieces. The mounting spacers 122 may alternatively be elongate and may have a cross-sectional shape defining any polygonal shape known to those of ordinary skill in the art. Alternatively, the mounting spacers 122 may not be elongate. Still further, the mounting spacers 122 may not be separate, but may instead be one unitary spacer that supports the armrest pad 120.

The mounting spacers 122 may be made of any material known to those of ordinary skill in the art, including a wide variety of well-known polymeric materials, including, for example, polyethylene (PE), low density polyethylene (LDPE), high density polyethylene (HDPE), polyethylene terephthalate (PET), polyamide (PA), polyvinyl chloride (PVC), polycarbonate (PC), polypropylene (PP), and/or combinations thereof. The mounting spacers 122 may be molded, extruded, or formed by any other method known to those of ordinary skill in the art. In some embodiments, none of the mounting spacers 122 are included.

The rising platform 124 acts as a rigid platform with which the armrest pad 120 is coupled. The rising platform 124 can be fixedly coupled with the armrest pad 120 and can translate vertically with the armrest pad 120 when a user adjusts the armrest 110. The rising platform 124 has a top face 160, a bottom face 162, and a side face 164. The rising platform 124 can interface with the mounting spacers 122 on the top face 160 thereof. The mounting spacers 122 may be coupled with the rising platform 124, or the mounting spacers 122 may rest upon the rising platform 124. The mounting spacers 122 may be coupled with the rising platform 124 with glue, magnets, welding, screws, pins, rivets, or any other method of coupling known to those of ordinary skill in the art. In some embodiments, the corners of the rising platform 124 can be rounded.

Further, the rising platform 124 may be coupled to the armrest pad 120 with screws, pins, rods, or any other coupling mechanism known to those of ordinary skill in the art. In some embodiments, screws are placed through apertures (not shown) that are disposed along the rising platform. The screws can be inserted through a hollow center of the mounting spacers 122, possibly with a nut disposed therein, and can be coupled in some fashion with the armrest pad 120. In some embodiments, the center of the mounting spacers 122 is not hollow, thus, the screws are coupled directly to the mounting spacers 122. In some embodiments, the mounting spacers 122 are coupled to one or both of the armrest pad 120 and the rising platform 124 with an adhesive.

The rising platform 124 may be in the shape of a rounded rectangle, or may be any shape known to those of ordinary skill in the art. Further, in some embodiments, the rising platform 124 may be generally the same shape as the lower edge 158 of the armrest pad 120. A nut aperture 166 that receives the nut 126 may be provided within a center of the rising platform 124. The nut aperture 166 can also be provided at a point off-center within or along the rising platform 124.

Still referring to FIG. 5, the nut 126 can be retained in place within the nut aperture 166 of the rising platform 124 during use of the assembly 108. The nut 126 may be coupled with the rising platform 124 via any method of coupling, including by snap fit, interference fit, molding, glue, welding, or any other method of coupling. As will be discussed in greater detail below, during use of the assembly 108, the nut 126 remains fixedly coupled with the rising platform 124, and when the rod 128 is rotated by the user, the nut 126 can translate vertically up or down along the rod 128, thereby raising or lowering the rising platform 124. The nut 126 may be any nut known to those of ordinary skill in the art. For example, in some embodiments, the nut 126 is a precision round nut. In other embodiments, the nut 126 is a hex nut, a heavy hex nut, a nylon insert lock, a jam nut, a nylon insert jam lock, a wing nut, a flange nut, a tee nut, a square nut, a prevailing torque lock nut, a coupling nut, a kep nut, a castle nut, or a slotted nut. The nut 126 may have any shape that allows it to be secured within the nut aperture 166 of the rising platform 124.

The one or more rotation stops 144 can be provided along the stationary plate 146 and, in some embodiments, the rotation stops 144 are secured with the stationary plate 146. The rotation stops 144 may be secured to the stationary plate 146 via any of the aforementioned methods of coupling. The rotation stops 144 can each have a first or short wall 170, a second or long wall 172, and a third or back wall 174. The second wall 172 and the first wall 170 can act as stops to prevent rotation of the rising platform 124 when the armrest pad 120 is being raised or lowered. As will be explained in greater detail below, the first wall 170 and the second wall 172 can be approximately the same distance apart as the width of the rising platform 124. When a torque is applied to the rising platform 124 via the rod 128, depending on the direction of the torque, either both of the first walls 170, or both of the second walls 172 of the rotation stops 144 can physically interact with the side face 164 of the rising platform 124 to prevent or substantially prevent rotation of the rising platform about the rod 128.

Still referring to FIG. 5, the first wall 170, the second wall 172, and the third wall 174 of the rotation stops 144 need not be coupled together, but rather may be formed from a planar piece of metal or other rigid material. However, in some embodiments, the first wall 170, the second wall 172, and the third wall 174 are coupled to one another, or may be integrally formed with one another. The rotation stops 144 can further include a bottom or fourth wall 176, the fourth wall 176 having a stop slot 178 that can engage with the crank rod 138, as will be discussed in greater detail below. The stop slots 178 can be generally radial or rounded slots. Further, a notch 180 can be provided within the stop slots 178 that can receive the crank rod 138, and can secure the crank rod 138 in place when the armrest 110 has been adjusted by a user. In some embodiments, the rotation stops 144 are identically formed. In other embodiments, the rotation stops 144 have different shapes.

Still referring to FIG. 5, the rod 128 is shown. The rod 128 can have threading 182 disposed along a substantial portion of the rod's length. When the assembly 108 is assembled, a threaded end 184 of the threaded rod 128 can be threaded with the nut 126, and the handle end 134 of the threaded rod 128 can be coupled with the crank 136. In some embodiments, the handle end 134 does not have any threading 182. The rod 128 may be of any length. In some embodiments, the rod 128 has a length of between about 5 cm and about 60 cm, or between about 10 cm and about 45 cm, or about 40 cm. The rod 128 may further have a wide variety of threading.

In some embodiments, the threading 182 covers the entire rod 128. In other embodiments, between about 20% and about 80% of the length of the rod 128 is covered by the threading 182. The rod 128 may have a diameter of between about 6 mm and about 45 mm, or between about 15 mm and about 35 mm, or about 20 mm. In some embodiments, the rod 128 is made of Grade 4.6, 4.8, 5.6, 8.8 or any other Grade rod. The rod 128 may have any threading 182 including Unified, UNJ, Metric, Acme, Trapezoidal, Worms, Knurls, or any other type of threading known to those of ordinary skill in the art. Still further, the rod 128 may be formed of carbon and alloy steel, stainless steel, nickel alloys, brass, aluminum, or any other material known to those of ordinary skill in the art. When the assembly 108 is fully assembled, the handle end 134 of the threaded rod 128 can be positioned through the flanged bushing 130, as will be discussed below.

As illustrated in FIG. 5, the bushing 130 is shown as a flanged bushing, however, the bushing 130 may be any bushing capable of performing the function of allowing the rod 128 to rotate, while maintaining the rod 128 axially within a rod bore 186 of the stationary plate 146. The bushing 130 may be a flanged bushing in the sense that the bushing 130 is a sleeve bushing with a flange at one end extending radially outward from the outer diameter of the bushing 130. In some embodiments, the bushing 130 is an oil-embedded flanged bushing. The bushing 130 can remain in place within the rod bore 186 of the stationary plate and can allow the rod 128 to rotate.

The crank 136 can be an arm attached to the rod 128 in an orthogonal fashion. Rotating the rod 128 axially allows reciprocating motion to be imparted to the rod 128. In some embodiments, the crank 136 is fixedly coupled with the rod 128 such that when the crank 136 is rotated, the rod 128 also rotates. When rotation of the crank 136, and thus, the rod 128, occurs, the threaded rod 128 rotates but the nut 126 remains in place. As a result, since the nut 126 is fixedly coupled with the rising platform 124, the nut 126 and the rising platform 124 translate vertically, either up or down, depending on the direction of rotation of the crank 136, i.e., clockwise or counterclockwise.

The crank rod 138 can operate as the inner, rigid portion of the handle 132 to maintain the crank handle 142. The crank rod 138 can be flanged at an upper end 188 and can be flanged at a lower end 190. The flanged upper end 188 and flanged lower end 190 of the crank rod 138 maintain the crank handle 142 and the spring 140 in position, as will be discussed below. An elongate portion 192 of the crank handle 142 can be received by a crank bore 194 of the crank 136. One of a plurality of rod slots 196 within the stationary plate 146 can be formed to receive the handle end 134 of the rod 128. The spring 140 can also be positioned along the elongate portion 192 of the crank handle 142. In some embodiments, the crank handle 142 is fixedly attached to the elongate portion 192 near the flanged lower end 190 of the crank handle 142. The flanged upper end 188 can be positioned above the crank bore 194 such that the crank bore 194 and the elongate portion 192 of the crank rod 138 are rotatably coupled. The spring 140 can be disposed between an upper end 188 of the crank handle 142 and a bottom surface 198 of the crank 136.

As a result, the spring 140 can keep the flanged upper end 188 of the crank 136 in place adjacent an upper surface 200 of the crank 136 unless an upward force is applied to the crank handle 142 to compress the spring 140, which would allow the flanged upper end 188 of the crank rod 138 to be spaced apart from the upper surface 200 of the crank 136. This allows the handle 132 to be fixed in place within one of the plurality of rod slots 196 of the stationary plate 146 and within one of the notches 180 formed within one of the stop slots 178. The spring 140 may be any spring known to those of ordinary skill in the art. The crank handle 142 may be a cylindrical tube that can be received by the elongate portion 192 of the crank rod 138. The crank handle 142, the crank 136 and/or the crank rod 138 may be formed of any one of the aforementioned polymeric materials and/or metal materials.

Figure 6:
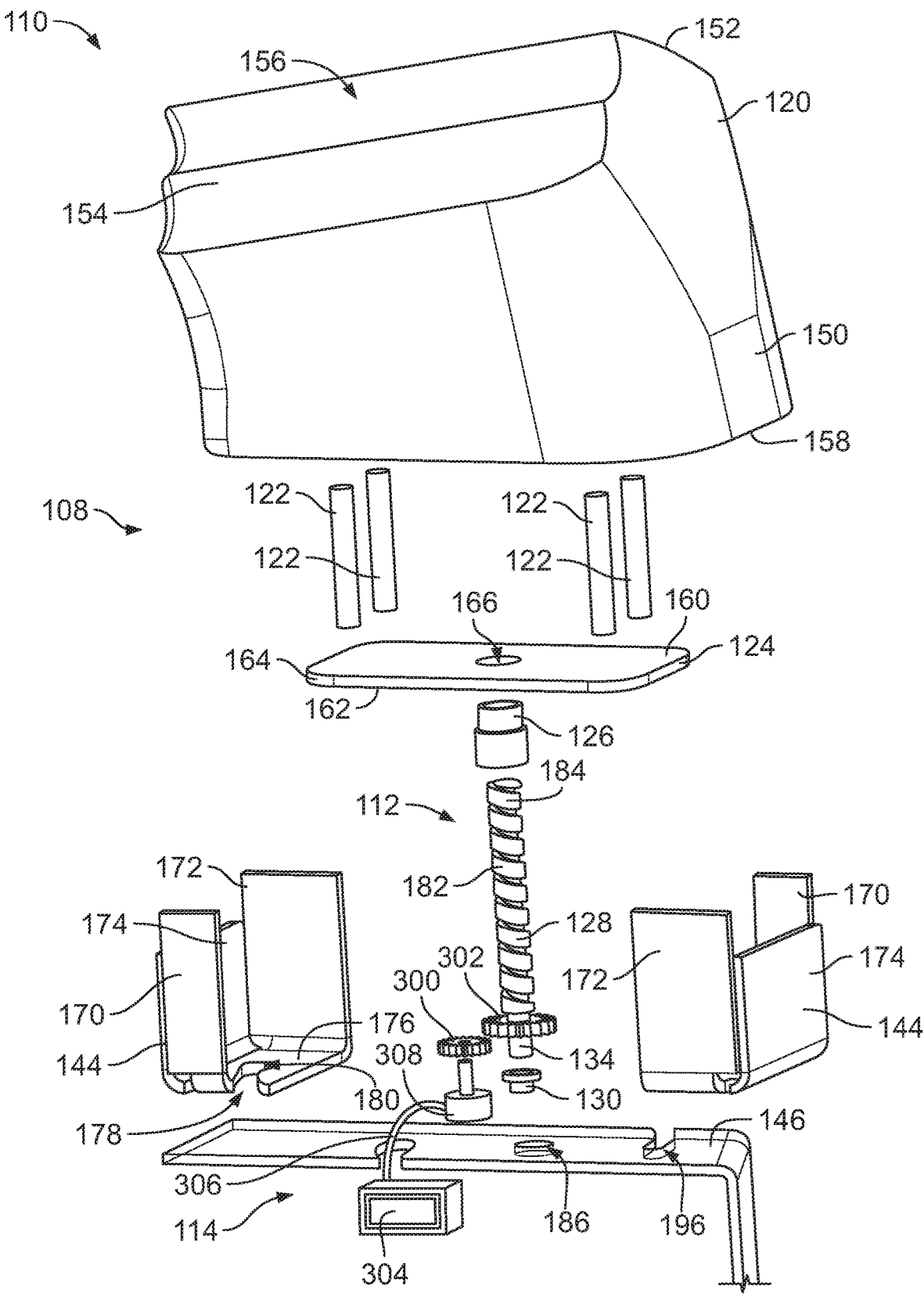
FIG. 6 is an exploded view of another embodiment of an armrest assembly according to the present disclosure.

In another embodiment, instead of using the handle 132 that includes the crank 136, the crank rod 138, the spring 140, and the crank handle 142, the adjustment mechanism 114 may include automatic components that raise and lower the armrest 110. For example, and referring to FIG. 6, some embodiments can include a drive gear 300, a slave gear 302, a smart device 304, and one or more wires 306 that electrically connect the smart device 304 with a motor 308. The smart device 304 may be an electronic device that is connected to one or more other devices or networks via one or more wireless or wired protocols.

In some embodiments, the armrest 110 does not include wires 306. Instead, the smart device 304 and the drive gear 300 may be wirelessly connected. In this embodiment, a signal is sent to the smart device 304 to adjust the height of the armrest 110. The signal may be caused by a card that is swiped near the smart device 304 that indicates that a particular user is utilizing the material handling vehicle 102. Another signal may be sent from a computer, a smart phone, or another electronic device that sends a signal to the smart device 304 to turn the drive gear 300. The gears 300, 302 can operate to spin the rod 128 about the longitudinal axis that defines the rod 124 in the same manner as the embodiment of FIGS. 3-5, which can allow the armrest 110 to move up and down.

Referring now to the manually driven assembly as illustrated in FIGS. 3-5, to adjust the height of the armrest pad 120, an operator can unlock the crank assembly 108, push up on the crank rod 138, rotate the crank rod 138 counter clockwise until the crank rod 138 is not disposed within either of the slots 196 in the stationary plate 146, and then release the crank rod 138. The user can ensure that the crank rod 138 springs down below the stationary plate 146. The user can then rotate as needed to raise or lower the armrest 110 subsequent to which the user can lock the crank assembly 108 in place.

To lock the handle 132 in place, the user can push up on the crank rod 138 such that the crank handle 142 is biased toward the crank 136. The user can then turn the crank 136 clockwise until the crank rod 138 is positioned within one of the rod slots 196 formed in the stationary plate 146 and one of the notches 180 disposed within one of the rotation stops 144. The user can then release the crank rod 138 to allow the crank rod 138 to spring downward, away from the crank 136. The force of the spring 140 can bias the flanged upper end 188 of the crank rod 138 to sit in one of the notches 180 formed inthe rotation stops 144. Finally, the user can ensure that the flanged upper end 188 of the crank rod 138 is seated before letting go of the crank handle 142.

In some embodiments, the adjustable armrest 110 can be mounted above the lower cover set to allow a key stitch, key pad, and/or any extra pockets to be accessible to the user or operator of the material handling vehicle 102. However, the assembly 108, including the armrest 110, does not impede the operator's usable space. In some embodiments, the assembly 108 is a separate sub assembly such that it can be an easy add-on option to the operator compartment 100 of the material handling vehicle 102. The desired height adjustment of the armrest 110 can be changed by changing the length of the rod 128 and/or the height of the rotation stops 144.

Further, little to no operational maintenance is required by a user or operator. The assembly 108 is easily lockable as the handle 132 can lock in availabale positions along its rotation. The multiple position lock allows the operator to lock the handle 132 toward the inside or the outside of the material handling vehicle 102. Still further, there are no tools required to operate the armrest 110, the armrest 110 can be quickly adjusted, and the armrest 110 can be operated while the operator is wearing gloves.

Alternative methods of construction are also possible. A rod or a slot could be used to stop rotation of the rising platform 124 instead of the formed rotation stops 144. Further, an alternate handle and/or locking mechanisms could be used to provide ease of use. Still further, different pad mounting methods could be used to attach the armrest pad 120 to the rising platform 124. If desired, a roller bearing could be used instead of the bushing 130. As previously noted, the electric motor 308 that can be controlled by the smart device 304 or a card reader could be used to control the motor 308. In some embodiments, the smart device 304 can automatically recognize the operator due to a signal sent out from an object carried by the operator, and can adjust the rod 128 based on what the operator programs the desirable height to be for that user.

The foregoing description was primarily directed to embodiments of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not be limited by the above disclosure.

What is claimed is:

1. An assembly for adjusting an armrest comprising:
   an armrest that includes:
      an armrest pad;
      a rising platform having a nut aperture; and
      a nut positioned within the nut aperture;
   a rod assembly that includes a rod and is coupled with the armrest;
   an adjustment mechanism for raising or lowering the armrest that is mechanically coupled with the rod; and
   one or more rotation stops coupled with a stationary plate.

2. The assembly of claim 1, wherein the rod assembly includes the rod, a flanged bushing, and a nut coupled with the rising platform.

3. The assembly of claim 2, wherein the rod includes a threaded end and a handle end,
   wherein the threaded end is threaded through the nut, and
   wherein the handle end is coupled with the adjustment mechanism.

4. The assembly of claim 3, wherein the adjustment mechanism includes a crank, a crank rod, a spring, and a crank handle.

5. The assembly of claim 4, wherein the crank is coupled with the handle end of the rod and the crank rod, and
   wherein the spring and the crank handle are positioned along an elongate portion of the crank rod.

6. The assembly of claim 3, wherein the adjustment mechanism includes a smart device electrically coupled with a drive gear, and a slave gear in communication with the drive gear and coupled to the rod.

7. The assembly of claim 1, further comprising one or more handle slots within the rotation stops.

8. The assembly of claim 1, further comprising one or more mounting spacers positioned between the armrest pad and the rising platform.

9. The assembly of claim 1, wherein the armrest pad includes an arm slot and the rising platform has a rounded rectangle shape.

10. The assembly of claim 1, wherein the stationary plate is coupled with a material handling vehicle.

11. An assembly for adjusting an armrest comprising:
    an armrest that includes:
       an armrest pad;
       a rising platform having a nut aperture;
       a nut positioned within the nut aperture;
    a rod assembly coupled with the armrest, the rod assembly including:
       a threaded rod; and
       a flanged bushing;
    an adjustment mechanism for raising or lowering the armrest, the adjustment mechanism being mechanically coupled with the threaded rod; and one or more rotation stops coupled with a stationary plate, wherein the flanged bushing is in rotatable communication with a bore within the stationary plate.

12. The assembly for adjusting an armrest of claim 11, wherein the nut is a precision round nut.

13. The assembly for adjusting an armrest of claim 11, wherein the adjustment mechanism includes a handle coupled with the threaded rod.

14. The assembly for adjusting an armrest of claim 11, wherein the adjustment mechanism includes a smart device electrically coupled with one or more gears, the one or more gears mechanically coupling the smart device with the threaded rod.

15. The assembly for adjusting an armrest of claim 11, further comprising two or more elongate mounting spacers positioned between the armrest pad and the rising platform.

16. The assembly for adjusting an armrest of claim 11, wherein the one or more rotation stops each include a first wall, a second wall, and a third wall.

17. A method of vertically translating an armrest assembly comprising:

engaging a rod assembly having a rod with an adjustment mechanism and an armrest, the armrest comprising an armrest pad, a rising platform having a nut aperture, and a nut positioned within the nut aperture; and adjusting the adjustment mechanism to initiate vertical translation of the armrest, wherein adjusting the adjustment mechanism includes rotating the rod of the rod assembly about an axis to vertically translate the armrest.

18. The method of claim 17, wherein adjusting the adjustment mechanism includes rotating a crank handle about the axis, wherein the crank handle is coupled with a crank rod and a crank, the crank being rotatably coupled with a handle end of the rod.

19. The method of claim 18, further comprising engaging the crank rod within a slot of a stationary plate, the stationary plate having a bore therethrough and a flanged bushing being positioned within the bore.

20. The method of claim 17, wherein adjusting the adjustment mechanism includes initiating a smart device to rotate a drive gear that is coupled with a slave gear, the slave gear being fixedly attached with the rod.

* * * * *